United States Patent
Stampoulidis et al.

(10) Patent No.: US 8,755,112 B2
(45) Date of Patent: Jun. 17, 2014

(54) OPTICAL FIBER AMPLIFIER ARRAY

(71) Applicants: Leontios Stampoulidis, Athens (GR);
Efstratios Kehayas, Athens (GR)

(72) Inventors: Leontios Stampoulidis, Athens (GR);
Efstratios Kehayas, Athens (GR)

(73) Assignee: Gooch and Housego PLC, Somerset (GB)

( * ) Notice: Subject to any disclaimer, the term of this patent is extended or adjusted under 35 U.S.C. 154(b) by 8 days.

(21) Appl. No.: 13/669,067

(22) Filed: Nov. 5, 2012

(65) Prior Publication Data
US 2013/0114130 A1     May 9, 2013

Related U.S. Application Data

(60) Provisional application No. 61/555,382, filed on Nov. 3, 2011.

(51) Int. Cl.
*H01S 3/091*     (2006.01)
*H01S 3/23*     (2006.01)

(52) U.S. Cl.
USPC ............................ 359/349; 359/341.3

(58) Field of Classification Search
USPC ................ 359/349, 341.3, 341.32
See application file for complete search history.

(56) References Cited

U.S. PATENT DOCUMENTS 8,189,258 B2 *   5/2012   Rapp et al. ............... 359/341.33
2011/0097086 A1 *   4/2011   Binkert et al. .................. 398/71

* cited by examiner

*Primary Examiner* — Mark Hellner
(74) *Attorney, Agent, or Firm* — Jetter & Associates, P.A.

(57) ABSTRACT

Devices and techniques are disclosed for amplifying a plurality of optical signals using a single pump laser coupled to a set of optical splitters arranged in a binary tree configuration for powering a plurality of fiber optical amplifying path circuits (FOAP circuits) each configured to amplify one of the plurality of optical signals, where each of the optical splitters at the leaves of the binary tree is coupled to one of the plurality of FOAP circuits to provide the power required to amplify the optical signal.

15 Claims, 14 Drawing Sheets

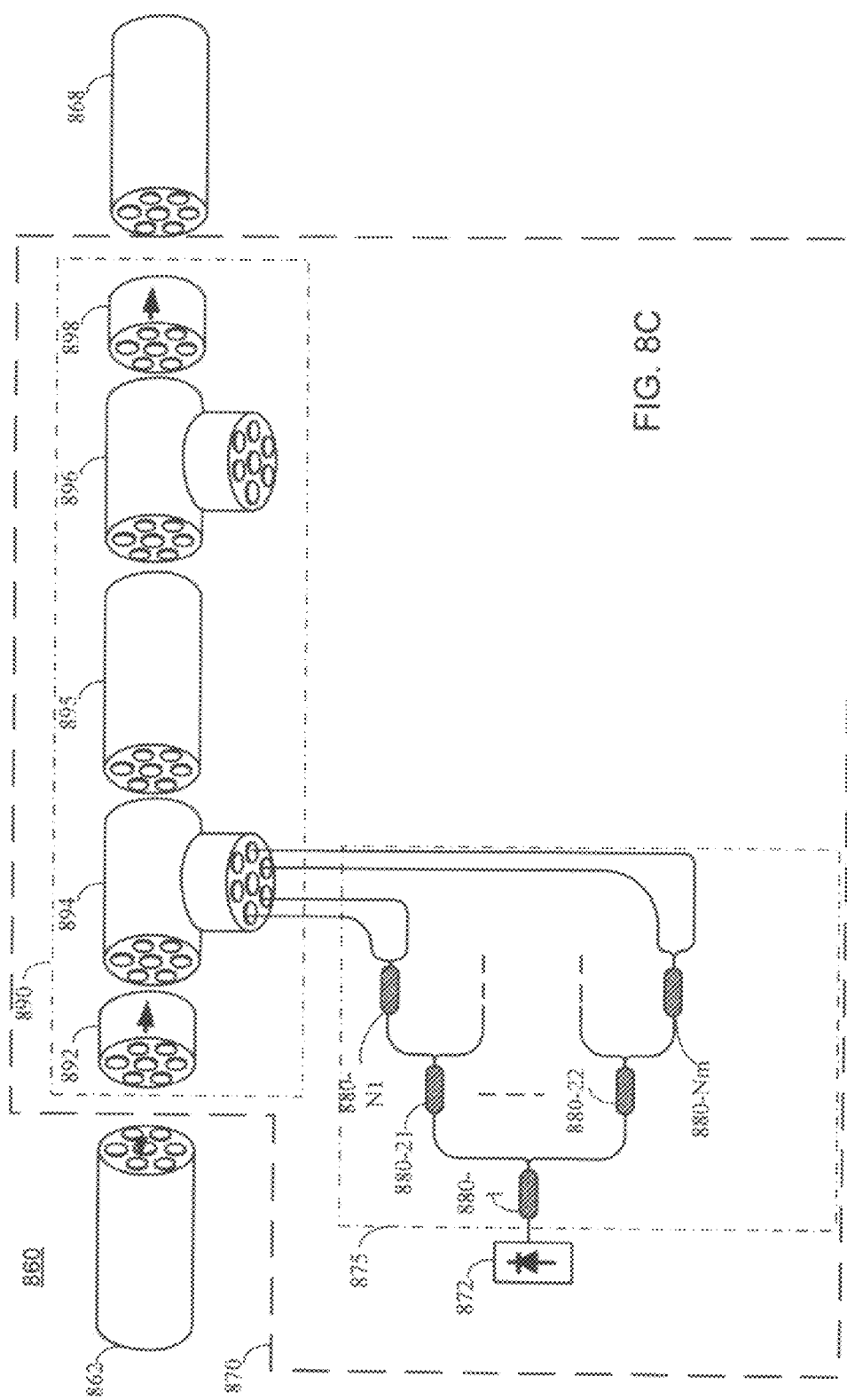

OPTICAL FIBER AMPLIFIER ARRAY

RELATED APPLICATIONS

This application claims the benefit of U.S. Provisional Application No. 61/555,382, filed on Nov. 3, 2011, commonly owned and assigned to the same assignee hereof.

BACKGROUND

1. Field

The present disclosure relates to optical fiber technology and in particular to optical fiber amplifiers.

2. Background

Optical fiber communications has been the main enabler for realizing high capacity communication networks capable to transport massive amounts of data over a single fiber. The development of optical fiber amplifiers (OFA) gave a robust solution to the first capacity brick-wall of communication networks.

Up to now, OFAs continue to dominate the market of long-haul, metro and more recently to optical access networks that are aggressively expanding in terms of reach and bit-rate, with intra-data centre connectivity also rapidly gaining momentum. The traditional characteristics of cost sensitivity, power consumption and footprint continue to be critical, however the ability to design amplifiers with custom performance metrics such as input/output power levels, gain and noise figure are becoming increasingly important. A method for building low-power and small footprint OFAs that have different performance characteristics with sub-linear scaling of cost, power consumption and footprint is highly desirable. Moreover, the real-time control of their performance in terms of optical output power can critically assist networks or transmission links that are no longer static, but evolve in a dynamic way according to traffic, number of channels, number of fibers, optical output power required and in the case of access networks, number of clients per geographic area.

In long-haul networks, in spite of the continuous upgrades in new transmission systems, the traffic growth estimates suggest that in the next decade, optical fiber capacity and corresponding transport systems will not be able to cope with capacity demands. A potential solution to the theoretical capacity limit of the fiber is the use of space through new Space Division Multiplexed (SDM) systems. New generation of multi-core (MCF), few-mode (FMF) or multi-mode (MMF) fibers will allow scaling of the total fiber bandwidth on the one hand, while also requiring optical amplification per space channel or mode in a cost effective method. Hence, the requirement to employ multiple DWDM-enabled optical fiber amplifiers is expected to dramatically increase in future high-capacity transport systems.

In addition to terrestrial fiber-optic networks, optical fiber amplifiers with high energy efficiency and small volume are becoming key components in space communications for inter- and intra-satellite links and as sub-systems in various sensing and processing systems within satellite payloads. In the case where multiple optical fiber amplifiers are required within payload systems, a way to sub-linearly scale footprint and power consumption becomes critical in order to optimize overall satellite weight, dimensions and power consumption during the mission.

The state of the art design of fiber amplifiers involves a laser pump source, an active fiber span and passive fiber-pigtailed components for coupling optical pump to data signals. The replication of this solution for obtaining a large number of OFAs scales linearly or even non-linearly factoring in additional cooling and hardware real-estate. Hence, the design of scalable OFAs in terms of cost, size and power will play a key role in the development of future high capacity networks. The terms "multiple optical fiber amplifier" and "optical fiber amplifier array" are used interchangeably in this application.

FIG. 1 shows various types of typical optical fiber amplifiers. First type (110) is an optical fiber amplifier (OFA) in which the optical path is pumped in co-propagating mode by a pump laser component (112). OFA-1 (110) includes an optical path input port coupled at one end of optical isolator (113). Optical isolator (113) is coupled at the other end to a first input of optical coupler (114). The second input of optical coupler (114) is coupled to the output port of pump laser (112). The output of optical coupler (114) is coupled to one end of doped fiber (115). The other end of doped fiber (115) is coupled to the input of optical coupler (116). The first output of optical coupler (116) is coupled to one end of optical isolator (117). The other end of optical isolator (117) is the output of OFA-1 (110).

The second type is an optical fiber amplifier in which all the optical paths are pumped in counter-propagating mode by a single pump laser component. OFA-2 (120, 130) includes an optical path input port coupled at one end of optical isolator (123, 133). According to a first implementation of OFA-2 (120), optical isolator (123) is coupled at the other end to a first input of optical coupler (124). The output of optical coupler (124) is coupled to one end of doped fiber (125).

In a second implementation of OFA-2 (130), optical isolator (133) is coupled at the other end directly to one end of doped fiber (135). The difference between the first and the second implementation of OFA-2 is that there is no optical coupler after the optical isolator in the second implementation, compared to the first implementation. In both implementations, the other end of doped fiber (125, 135) is coupled to the input of optical coupler (126, 136). The first output of optical coupler (126, 136) is coupled to one end of optical isolator (127, 137). The second output of optical coupler (126, 136) is coupled to the output port of pump laser (122, 132. The other end of each optical isolator (127, 137) is the output of OFA-2 (120, 130).

The third type is an optical fiber amplifier in which the optical paths are pumped in both co- and counter-propagating mode using two pump lasers. OFA-3 (140) includes an optical path input port coupled to one end of optical isolator (143). Optical isolator (143) is coupled at the other end to a first input of optical coupler (144). The second input of optical coupler (144) is coupled to the output port of first pump laser (142a). The output of optical coupler (144) is coupled to one end of doped fiber (145). The other end of doped fiber (145) is coupled to the input of optical coupler (146). The first output of optical coupler (146) is coupled to one end of optical isolator (147). The second output of optical coupler (146) is coupled to the output port of second pump laser (142b). The other end of optical isolator (147) is the output of OFA-3 (140).

FIG. 2 shows a typical optical fiber amplifier array (OAA) (200). OAA (200) includes a set of n OFAs (210, 220, 230, 240) each OFA including at least one pump laser (212, 222, 232, 242). Although OAA is shown including OFAs of the first type, one skilled in the art may appreciate that OAA may include OFAs of any type as described with reference to FIG. 1.

It would be desirable to have a multiple OFA that is cost-effective, compact and power efficient each OFA having custom and independent output power, noise performance, topology and operating wavelength band specifications.

SUMMARY

Devices and techniques are disclosed for amplifying a plurality of optical signals using a single pump laser coupled to a set of optical splitters arranged in a binary tree configuration for powering a plurality of fiber optical amplifying path circuits (FOAP circuit) each configured to amplify one of the plurality of optical signals, where each of the optical splitters at the leaves of the binary tree is coupled to one of the plurality of FOAP circuits to provide the power required to amplify the optical signal.

BRIEF DESCRIPTION OF THE DRAWINGS

FIG. 8C is a circuit level diagram of an optical fiber amplifier array employed in a Multi Core Fiber network according to a seventh exemplary embodiment.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The "exemplary" embodiment should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

The present disclosure enables a plurality of cost-effective, compact and power efficient optical fiber amplifiers each having custom and independent output power, noise performance, topology, and operating wavelength band specifications. Multiple optical fiber amplifier footprint, cost and electrical power consumption are improved due to the utilization of a single pump laser component.

In an exemplary embodiment, a single pump laser component is coupled to a plurality of fiber optical amplification path circuits (FOAP circuit or simply FOAP) of an optical fiber amplifier array through a network of 1×2 optical splitters connected in a binary tree configuration, which split the pump laser power. Each of the 1×2 optical splitters in the tree may have arbitrary splitting ratios. The output power of each optical path circuit in the optical fiber amplifier array is individually defined by the selection of the splitting ratios of the optical splitters in the tree.

The optical fiber amplifier array comprises a plurality of FOAP circuits each carrying a single wavelength or multi-wavelength optical signal and each including a single or multiple active fiber sections. The active fiber section or sections are doped with ions of the rare earth metals, such as erbium, ytterbium, thulium, praseodymium, neodymium, holmium or co-doped ytterbium and erbium or combination of other active materials that provide absorption at a specific wavelength band and provide emission at the same or another band.

Figure 3:
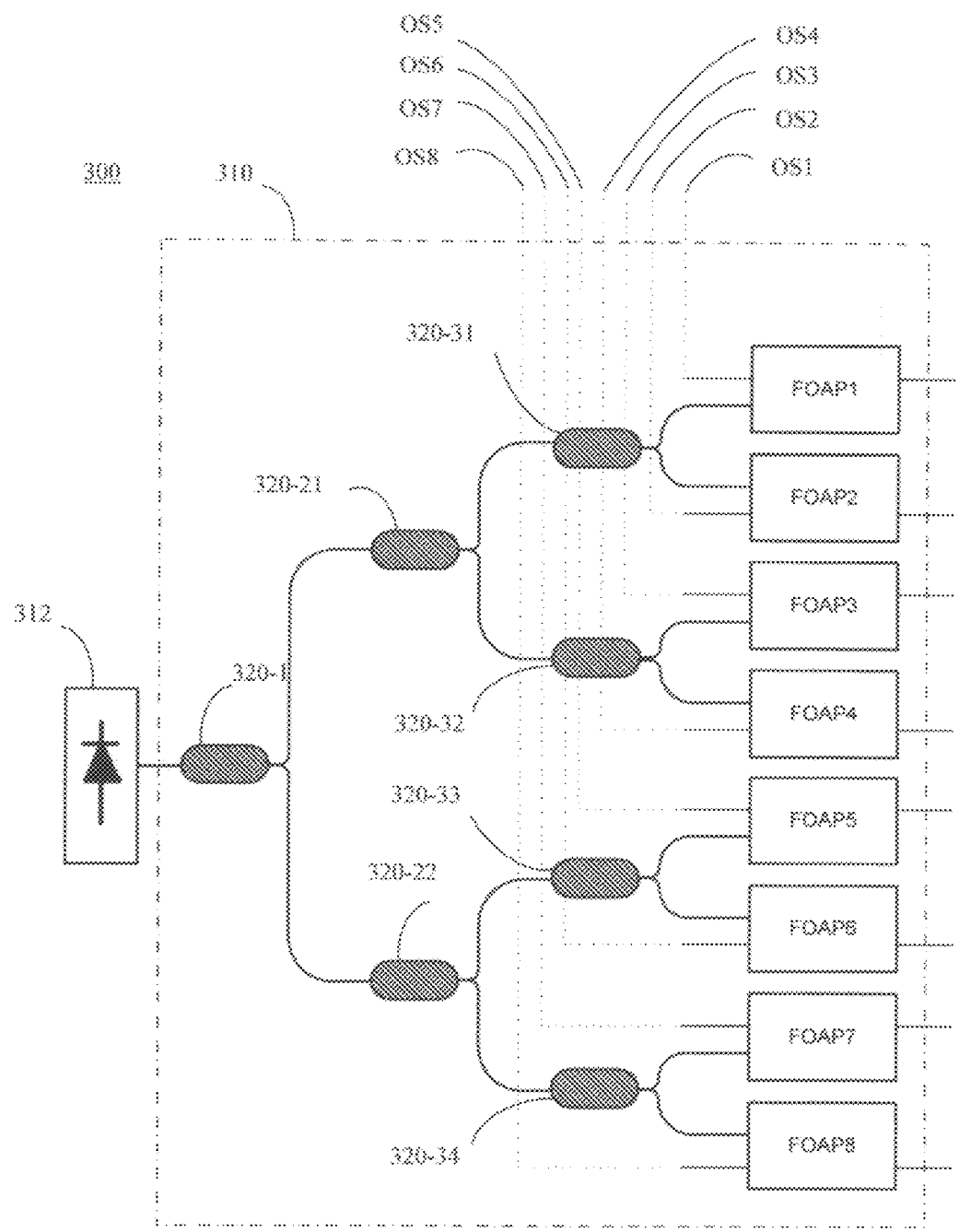
FIG. 3 is a block diagram of an optical fiber amplifier array according to an exemplary embodiment.

FIG. 3 is a block diagram of an optical fiber amplifier array (300) according to an exemplary embodiment. OAA (300) includes single pump laser (310) and optical amplification circuit (OAC) (310). OAC (310) includes a set of optical splitters (320-1, 320-21, 320-22, 320-31, . . . , 320-34), having arbitrary splitting ratios in a binary tree configuration and a set of 8 FOAPs (FOAP1 . . . FOAP8) configured to amplify a set of optical signals (OS1 . . . OS8). Single pump laser (312) is coupled to optical splitter (320-1) at the root of the binary tree and each of the 8 outputs of the optical splitters (420-31, . . . , 420-34) at the leaves of the binary tree is connected to one of FOAPs (FOAP1, . . . , FOAP8). Single pump laser (312) provides optical splitter (320-1) with an optical beam having a power equal to the sum of powers required by the specifications of FOAPs (FOAP1 . . . FOAP8). Optical splitter (320-1) splits the beam into two optical beams, according to its splitting ratio.

The two optical beams are provided as inputs to a pair of optical splitters (320-21, 320-22), each having its own splitting ratio, and so on, until the number of beams is equal to the number of FOAPs. The splitting ratios of the optical splitters are selected so as the final optical beams have the power required by the specifications of the FOAPs.

It is assumed that each binary tree configuration of optical splitters is unique to the specifications of each OAA. However, more than one solution of selecting binary tree configuration may be possible, provided that the power of each final beam is according to the requirements of each FOAP it powers. Furthermore, although the binary tree shown in the example of FIG. 3 is symmetric, one skilled in the art may appreciate that asymmetric binary trees may also be used according to the number of FOAPs. For example, in case of 10

(ten) FOAPs, an optical splitter is coupled to a binary tree leading to 8 (eight) FOAPs and to an optical splitter leading to 2 (two) FOAPs. Thus, 10 (ten) FOAPs are pumped with the use of an asymmetric binary tree. It should be noted that either the binary tree configuration or the components used to implement the FOAP circuits may be implemented using active or passive waveguides.

Figure 4:
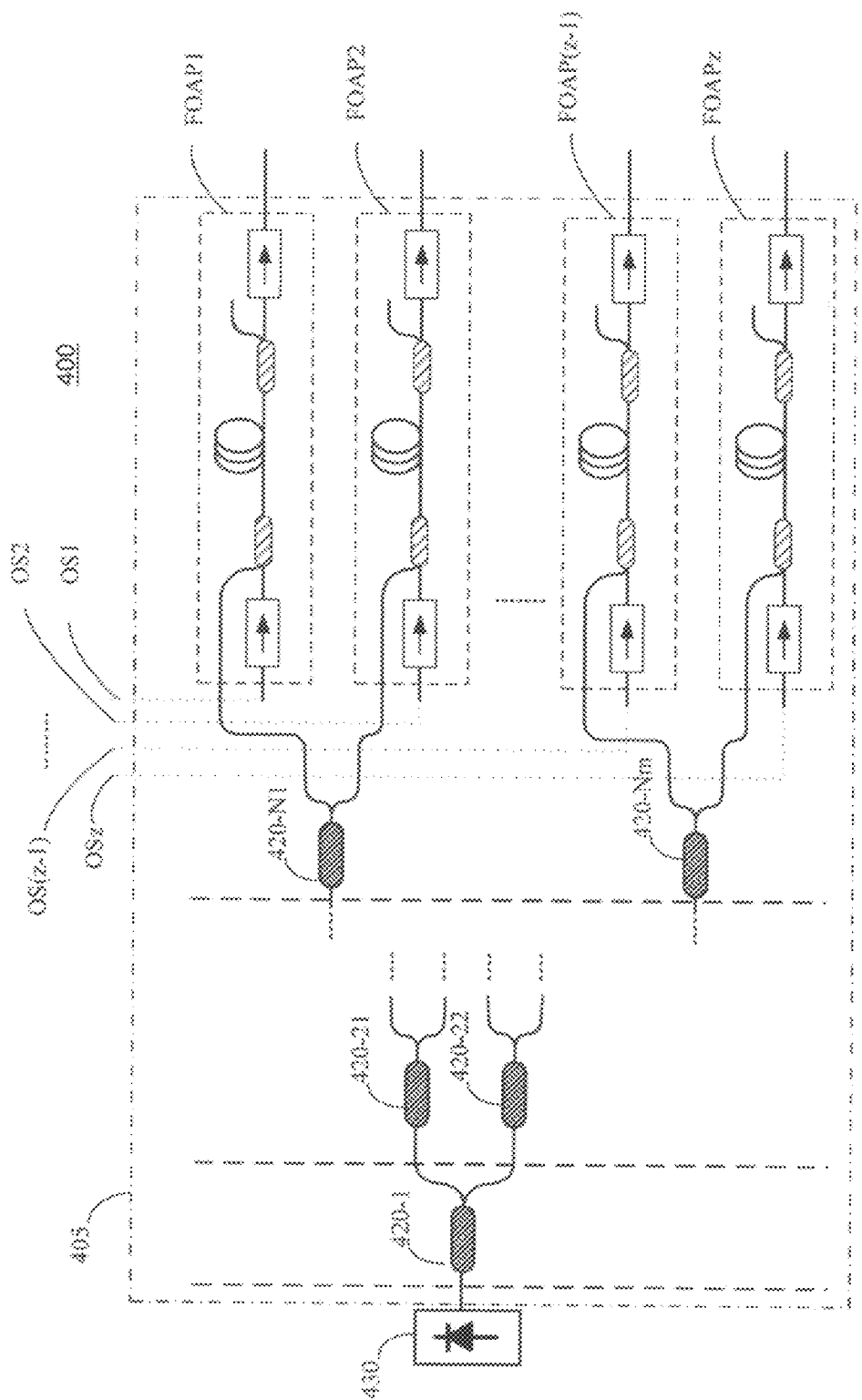
FIG. 4 is a circuit level diagram of an optical fiber amplifier array having FOAP circuits of a first type according to a second exemplary embodiment.

FIG. 4 is a circuit level diagram of an optical fiber amplifier array (400) having FOAP circuits of a first type according to a second exemplary embodiment. Pump laser output port of pump laser (430) is coupled to optical splitter (420-1) of OAC (405). Optical splitter (420-1) is an 1×2 optical splitter.

Optical splitter (420-1) has two optical splitter output ports. Each of the optical splitter output ports is coupled to a second and a third optical splitters (420-21, 420-22), respectively. In a similar manner the second and the third optical splitters have two output ports each coupled to a further optical splitter.

A binary tree of optical splitters is created where optical splitter 420-1 is at the root of the binary tree and optical splitters (420-N1) to (420-Nm) are at the leaves of the binary tree.

In the exemplary embodiment of FIG. 4, Z numbers of FOAPs are coupled to m number of optical splitters at the leaves of the binary tree through 2×m number of optical splitter output ports.

The OAA of FIG. 4 operates as follows: Single pump laser (430) provides optical splitter (420-1) with an optical beam having a power equal to the sum of powers required by the specifications of FOAPs (1 . . . Z). Optical splitter (420-1) splits the optical beam into two optical beams, according to its splitting ratio.

The two optical beams are provided to a pair of optical splitters, respectively, each having its own splitting ratio, and so on, until the number of optical beams is equal to the number of FOAPs. The splitting ratios of the optical splitters are selected so that the final optical beams have the power required by the specifications of the FOAPs to amplify a set of z optical signals (OS1 . . . OSz).

It is assumed that each binary tree configuration of optical splitters is unique to the specifications of each OAA. However, because any two FOAPs can be connected to one optical splitter, more than one solutions of selecting binary tree configuration may be possible, provided that the power of each final optical beam is according to the requirements of each FOAP it powers.

Figure 5:
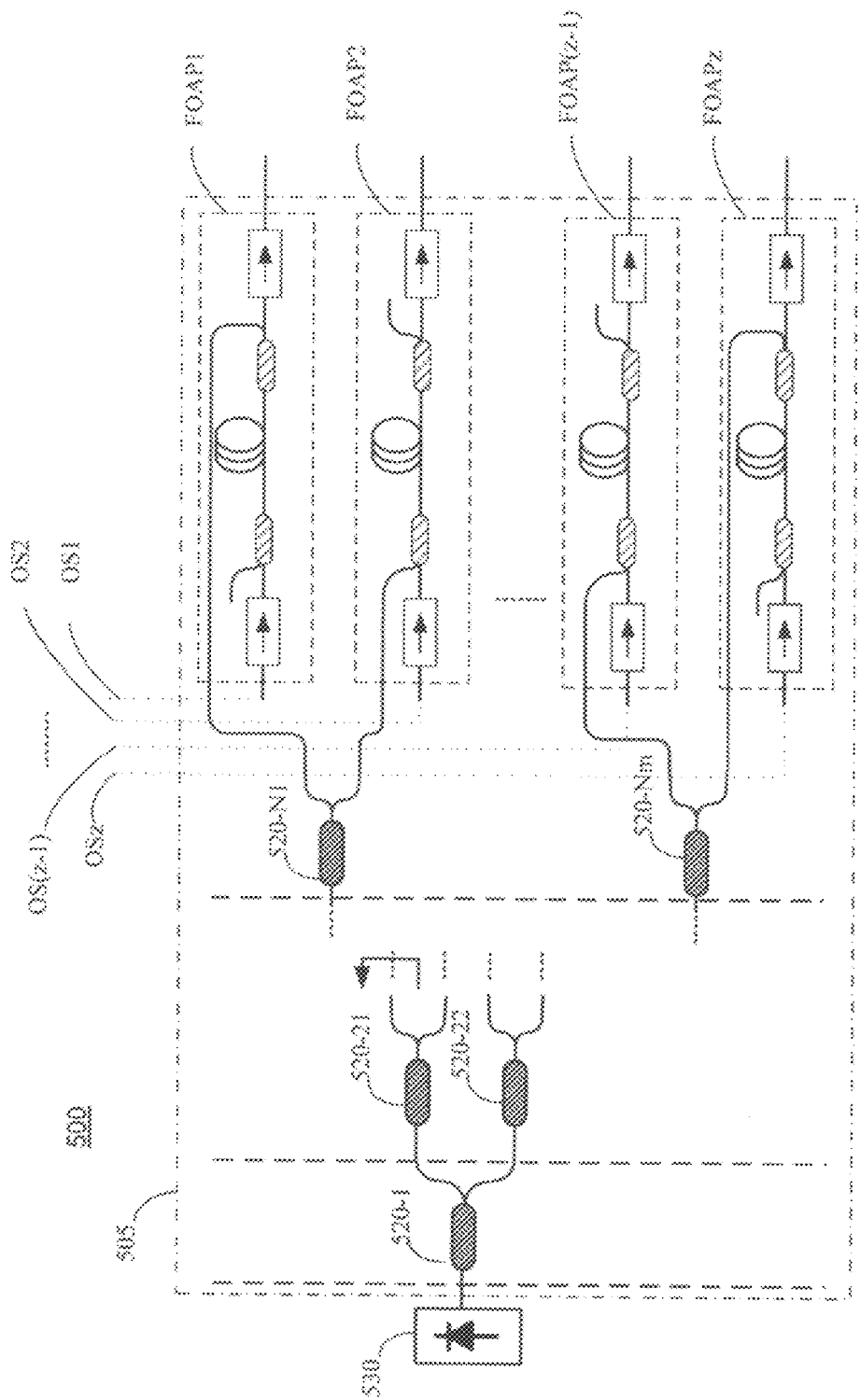
FIG. 5 is a circuit level diagram of an optical fiber amplifier array having FOAP circuits of first and second type according to a third exemplary embodiment.

FIG. 5 is a circuit level diagram of an optical fiber amplifier array (500) having FOAP circuits of first and second type according to a third exemplary embodiment. The pump laser output port of pump laser (530) is coupled to optical splitter (520-1) of OAC (505). Optical splitter (520-1) is an 1×2 optical splitter.

Optical splitter (520-1) has two optical splitter output ports. Each of the optical splitter output ports is coupled to a second and a third optical splitters (520-21, 520-22), respectively. In a similar manner the second and the third optical splitters have two output ports each coupled to a further optical splitter. Thus, a binary tree of optical splitters is created where optical splitter (520-1) is at the root of the binary tree and optical splitters (520-N1) to (520-Nm) are at the leaves of the binary tree.

In the exemplary embodiment of FIG. 5, Z numbers of FOAPs are coupled to m number of optical splitters at the leaves of the binary tree through 2×m number of optical splitter output ports. There are FOAPs of the first type (FOAP2, FOAP(Z−1)) and of the second type (FOAP 1, FOAPZ) in FIG. 5. It should be noted that the FOAP shown in FIG. 5 is equivalent to the FOAP of the second implementation of OFA-2 as described with reference to FIG. 1.

One skilled in the art may appreciate that both first and second implementation types of FOAP can be used without departing from the scope of the invention. Furthermore, one skilled in the art may appreciate that any number or combination of FOAPs of the first type and of the second type, first or second implementation, may be used in combination with the binary tree implementation of the optical splitters.

The succession of FOAPs of a first type and of a second type in FIG. 5 is simply shown for illustrative purposes.

OAA (500) of FIG. 5 operates as follows: Single pump laser (530) provides optical splitter (520-1) of OAC (505) with an optical beam having a power equal to the sum of powers required by the specifications of FOAPs (1 . . . Z). Optical splitter (520-11) splits the optical beam into two optical beams, according to its splitting ratio. The two optical beams are provided to a pair of optical splitters (520-21, 520-22), respectively, each having its own splitting ratio, and so on, until the number of optical beams is equal to the number of FOAPs. The splitting ratios of the optical splitters are selected so as the final optical beams have the power required by the specifications of the FOAPs to amplify a set of z optical signals (OS1 . . . OSz).

It is assumed that each binary tree configuration of optical splitters is unique to the specifications of each OAA. However, because any two FOAPs can be connected to one optical splitter, more than one solutions of selecting binary tree configuration may be possible, provided that the power of each final beam is according to the requirements of each FOAP it powers.

Figure 6:
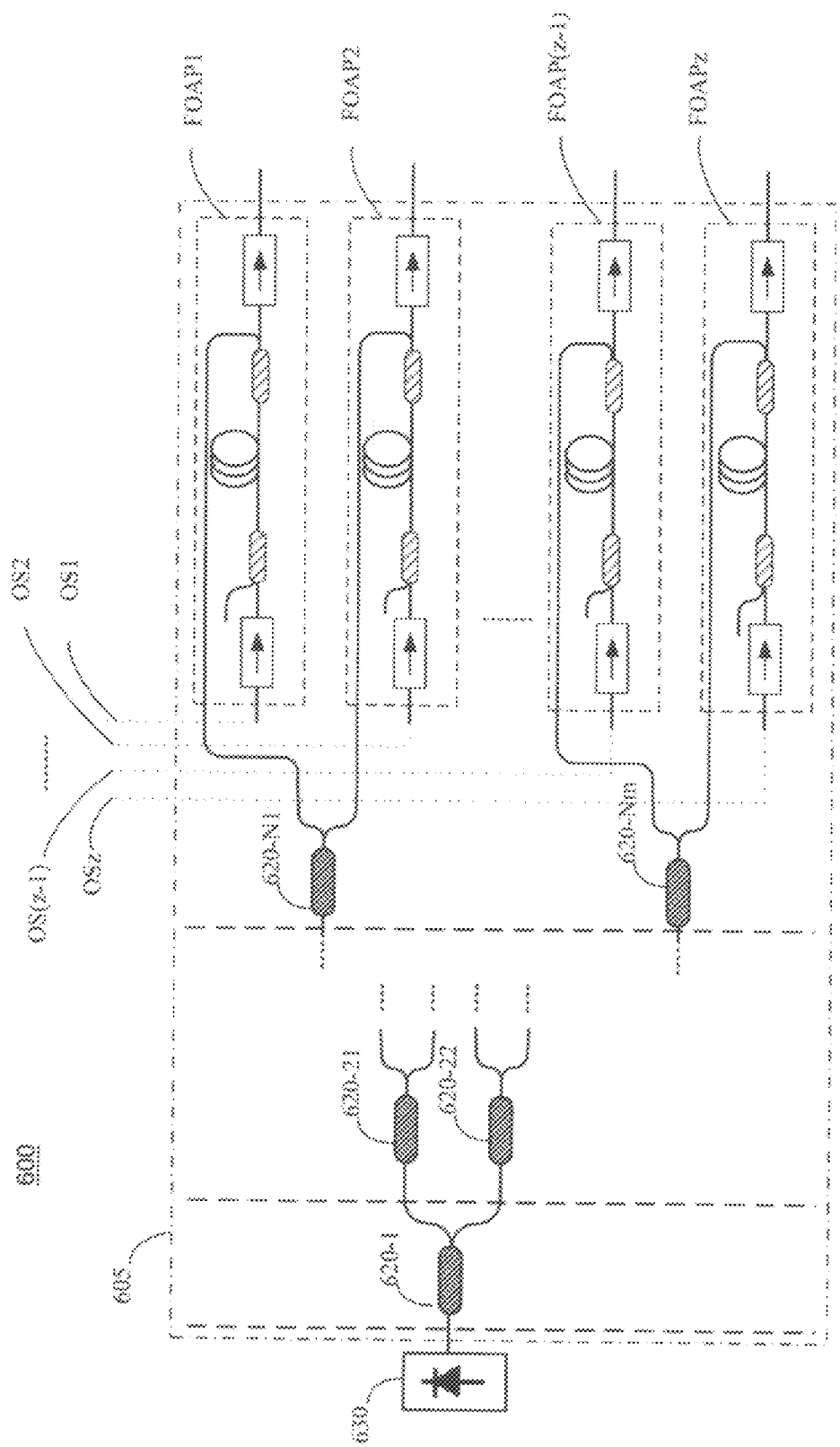
FIG. 6 is a circuit level diagram of an optical fiber amplifier array having FOAP circuits of second type according to a fourth exemplary embodiment.

FIG. 6 is a circuit level diagram of an optical fiber amplifier array (600) having FOAP circuits of second type according to a fourth exemplary embodiment. Pump laser output port of pump laser (630) is coupled to optical splitter (620-1) of OAC 605. Optical splitter (620-1) is an 1×2 optical splitter. Optical splitter (620-1) has two optical splitter output ports. Each of the optical splitter output ports is coupled to a second and a third optical splitters (620-21, 620-22), respectively. In a similar manner the second and the third optical splitters have two output ports each coupled with a further optical splitter. Thus, a binary tree of optical splitters is created where optical splitter (620-1) is at the root of the binary tree and optical splitters (620-N1) to (620-Mm) are at the leaves of the binary tree.

In the exemplary embodiment of FIG. 6, Z number of FOAP are coupled to m number of optical splitters at the leaves of the binary tree through 2×m number of optical splitter output ports. It should be noted that the FOAP shown in FIG. 6 is equivalent to the FOAP of the first implementation of OFA-2 as described with reference to FIG. 1.

One skilled in the art may appreciate that both first and second implementation types of FOAP can be used without departing from the scope of the invention. Furthermore, one skilled in the art may appreciate that any number or combination of FOAPs of the second type, first or second implementation, may be used in combination with the binary tree implementation of the optical splitters.

The OAA of FIG. 6 operates as follows: Single pump laser (630) provides optical splitter (620-1) with an optical beam—having a power equal to the sum of powers required by the specifications of FOAPs (1 . . . Z) to amplify a set of z optical signals (OS1 . . . OSz). Optical splitter (620-1) splits the beam into two optical beams, according to its splitting ratio. The two optical beams are provided to a pair of optical splitters (620-21, 620-22), respectively, each having its own splitting ratio, and so on, until the number of optical beams is equal to the number of FOAPs.

The splitting ratios of the optical splitters are selected so as the final optical beams have the power required by the specifications of the FOAPs. It is therefore assumed that each binary tree configuration of optical splitters is unique to the specifications of each OAA. However, since any two FOAPs can be connected to one optical splitter, more than one solutions of selecting binary tree configuration may be possible, provided that the power of each final beam is according to the requirements of each FOAP it powers.

Figure 7:
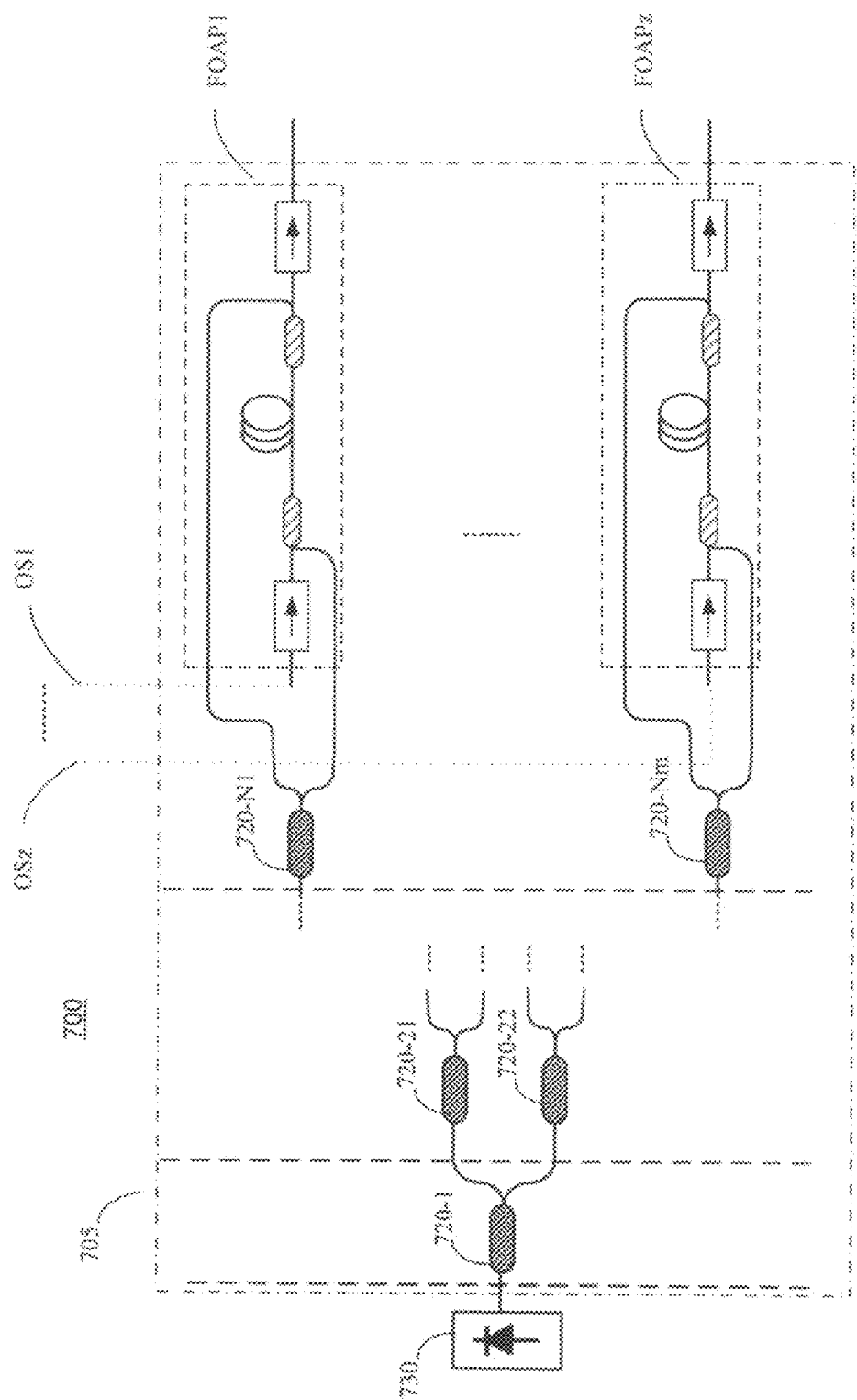
FIG. 7 is a circuit level diagram of an optical fiber amplifier array having FOAP circuits of third type according to a fifth exemplary embodiment.

FIG. 7 is a circuit level diagram of an optical fiber amplifier array (700) having FOAP circuits of third type according to a fifth exemplary embodiment. Pump laser output port of pump laser (730) is coupled to optical splitter (720-1). Optical splitter (720-1) is an 1×2 optical splitter. Optical splitter (720-1) has two optical splitter output ports. Each of the optical splitter output ports is coupled to a second and a third optical splitters (720-21, 720-22), respectively. In a similar manner the second and the third optical splitters have two output ports each coupled to a further optical splitter. Thus, a binary tree of optical splitters is created where optical splitter (720-1) is at the root of the binary tree and optical splitters (720-N1) to (720-Nm) are at the leaves of the binary tree.

In the exemplary embodiment of FIG. 7, Z numbers of FOAPs are coupled to m number of optical splitters at the leaves of the binary tree through 2×m number of optical splitter output ports. OAA (700) of FIG. 7 operates as follows: Single pump laser (730) provides optical splitter (720-1) with an optical beam having a power equal to the sum of powers required by the specifications of FOAPs (1 . . . Z) to amplify a set of z optical signals (OS1 . . . OSz). Optical splitter (720-1) splits the optical beam into two, according to its splitting ratio.

The two beams are provided to a pair of optical splitters (720-21, 720-22), respectively, each having its own splitting ratio, and so on, until the number of optical beams is equal to the number of FOAPs. The splitting ratios of the optical splitters are selected so that the final optical beams have the power required by the specifications of the FOAPs. It is assumed that each binary tree configuration of optical splitters is unique to the specifications of each OAA. Because any two FOAPs can be connected to one optical splitter, more than one solutions of selecting binary tree configuration may be possible, provided that the power of each final beam is according to the requirements of each FOAP it powers.

The binary tree configuration that is used to power the FOAPs operates optimally when uncontrolled operation is required, meaning that the pump laser is operated in Automatic Current Control. In the case where the output optical power or amplifier gain of each OAA within the array requires to be regulated, the pump laser needs to be controlled either electro-optically or all-optically. In the first case, an array of variable optical attenuators can be employed at the arm of each optical coupler entering the FOAP, hence achieving Automatic Power Control or Automatic Gain Control. Moreover, a controllable optical feedback can be introduced in each of the FOAPs for creating the necessary all-optical or electro-optic control of the gain of each of the amplifier.

FIGS. 4-7 imply the use of multi-fiber carriers for the optical signals that are amplified by the optical fiber amplifying arrays of the respective embodiments. However, the invention can be equally useful for non-multi-fiber carrier solutions. Currently two solutions are considered for increasing the capacity in the fiber: multi-core fiber (MCF) carriers and multi-mode fiber (MMF) carriers.

In the case of MCFs, a single fiber is replaced with a fiber of the same outer diameter but instead of having one core in the centre, several cores are included. In this way, the capacity is increased as the number of cores increases.

Figure 8A:
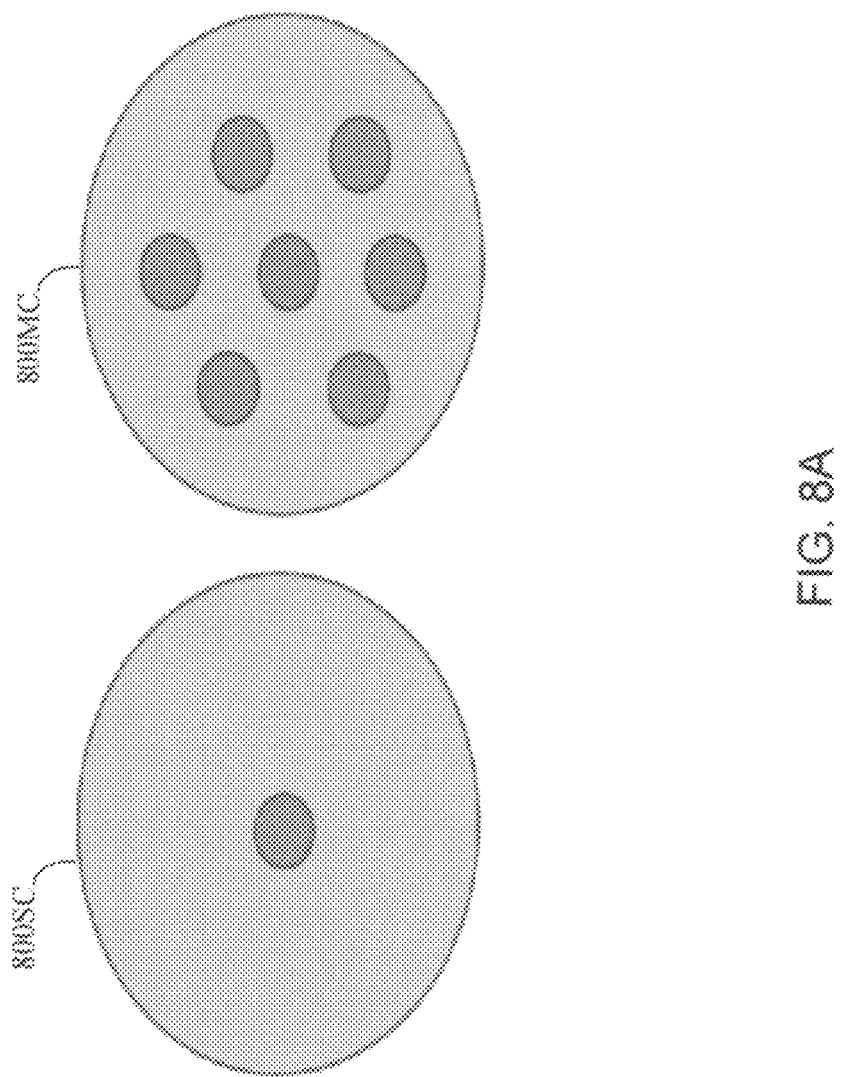
FIG. 8A shows an example of a cross-section of a single-core fiber and of a multi-core fiber.

FIG. 8A shows an example of a cross-section of a single-core fiber (800SC) and of a multi-core fiber (800MC). According to an example, a single-core fiber with diameter 5/125 μm is replaced with a fiber of the same outer diameter (125 microns) but instead of having one core in the centre, several cores are included. In this way, the capacity is increased as the number of cores increases.

Figure 8B:
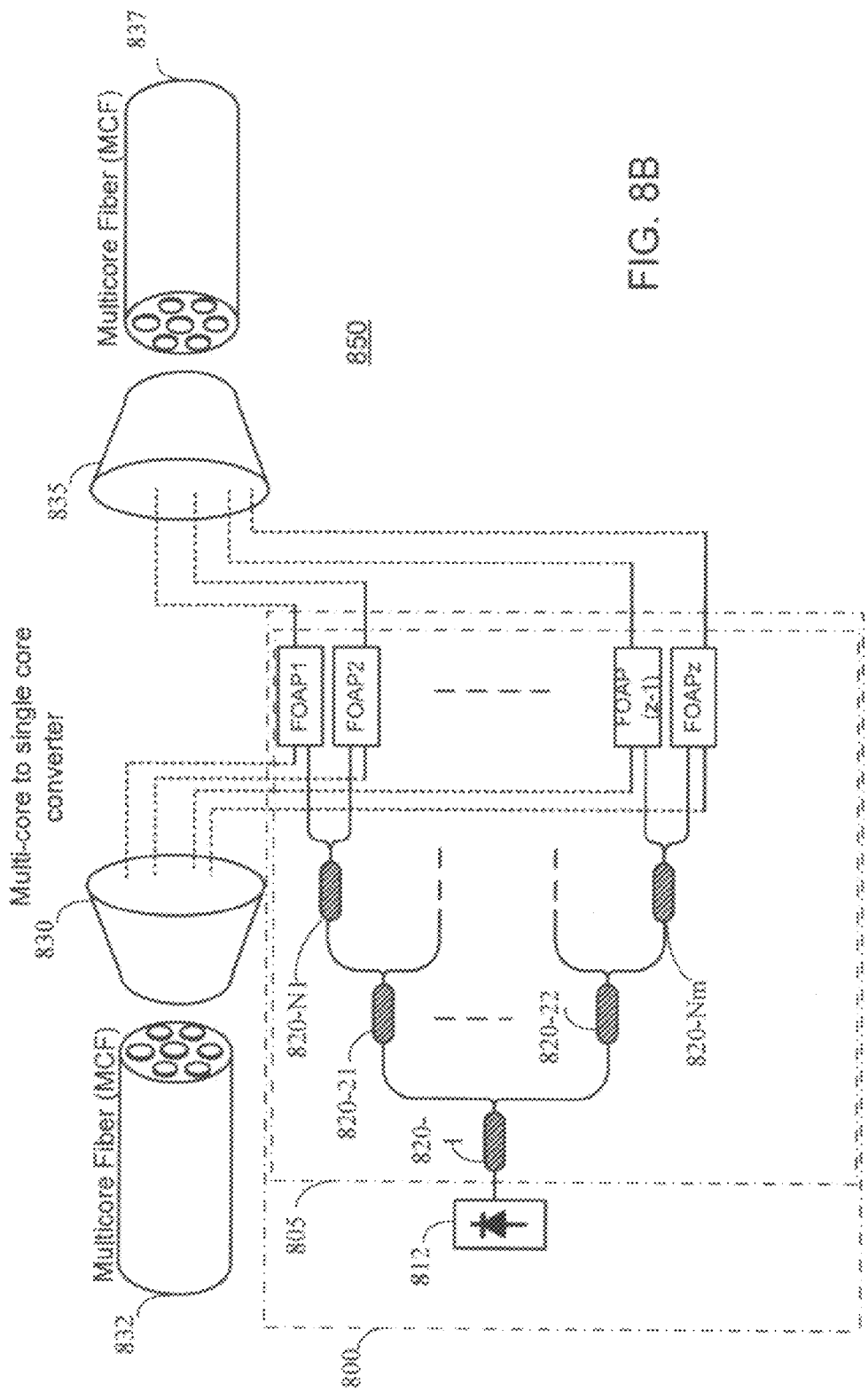
FIG. 8B is a circuit level diagram of an optical fiber amplifier array employed in a Multi Core Fiber (MCF) network according to a sixth exemplary embodiment.

FIG. 8B is a circuit level diagram of an optical fiber amplifier array employed in a Multi Core Fiber (MCF) network (850) according to a sixth exemplary embodiment. MCF network (850) includes OAA (800), multicore fiber (832), multi-core to single core converter (830), single-core to multi-core converter (835) and multi-core fiber (837). OAA (800) includes single pump laser (812) and OAC (805). OAC (805) includes a set of optical splitters (820-1, 820-21, 820-22, . . . , 820-N1 . . . 820-Nm), having arbitrary splitting ratios in a binary tree configuration and a set of z FOAPs (FOAP1 . . . FOAPz).

Single pump laser (812) is coupled to optical splitter (820-1) at the root of the binary tree and each of the outputs of the m optical splitters at the leaves of the binary tree is connected to one of FOAPs (FOAP1 . . . FOAPz). Single pump laser (812) provides optical splitter (820-1) with an optical beam having a power equal to the sum of powers required by the specification of each FOAP (FOAP1 . . . FOAPz).

Optical splitter (820-1) splits the optical beam into two optical beams, according to its splitting ratio. The two optical beams are provided to a pair of optical splitters (820-21, 820-22), each having its own splitting ratio, and so on, until the number of optical beams is equal to the number of FOAPs. The splitting ratios of the optical splitters are selected so that the final optical beams have the power required by the specifications of the FOAPs. Each of the final optical beams is input to one of the FOAPs. Each FOAP has two inputs. The first input is for the optical signal to be amplified and the second input is for each of the final optical beams.

In the exemplary embodiment of FIG. 8B, each first input is coupled to each core of incoming multi-core fiber (832) through multi-core to single core converter (830). Likewise, the output of each FOAP is coupled to a core of outgoing MCF (837) through single core to multi core converter (835). One skilled in the art may appreciate that the number of FOAPs is equal to the number of cores in each MCF. Furthermore, one skilled in the art may appreciate that the output of each FOAP may be coupled to a different single-core fiber.

FIG. 8C is a circuit level diagram of an optical fiber amplifier array (870) employed in a Multi Core Fiber network (860) according to a seventh exemplary embodiment. Multicore Fiber Network (860) uses multi-core passive and active components for building FOAPs.

In contrast to the circuit diagram of FIG. 8B where each FOAP is constructed using conventional single-core fibers, in the exemplary embodiment of FIG. 8C, a multi-core FOAP (MC-FOAP) (890) is constructed using multi-core passive and active components, such as multi-core isolators (892, 898), multi-core couplers (894, 896) and multi-core doped fibers (895). MCF network (860) includes OAA (870) and Multicore Fiber (862, 868). OAA (870) includes single pump laser (872), OAC (805) and MC-FOAP (890). OAC (805) includes a set of optical splitters (880-1, 880-21, 880-22 . . . 880-N1 . . . 880-Nm), having arbitrary splitting ratios in a binary tree configuration.

Single pump laser (872) is coupled to optical splitter (880-1) at the root of the binary tree and each of the outputs of the m optical splitters at the leaves of the binary tree is connected to one of the input ports of multi-core pump coupler (894) for coupling each signal into single or multiple cores. Single pump laser (872) provides optical splitter (880-1) with an optical beam having a power equal to the sum of powers required by the specification of each of the core within the MC-FOAP. Optical splitter (880-1) splits the optical beam into two optical beams, according to its splitting ratio. The two optical beams are provided to a pair of optical splitters (880-21, 880-22), each having its own splitting ratio, and so on, until the number of optical beams is equal to the number of cores required for MC-FOAP (890).

The splitting ratios of the optical splitters are selected so that the final optical beams have the power required by the specifications of the MC-FOAP. Each of the final optical beams is input to one or multiple cores of MC-FOAP (890).

In the exemplary embodiment of FIG. 8C, MC-FOAP (890) is depicted according to an amplifier of the first type, having a co-propagating multi-core pumping scheme.

The MC-FOAP has one input that consists of a single fiber with multiple cores (862). The optical path is connected to one input of the multi-core isolator (892), so that each core is aligned and light transmission occurs. The output of multi-core isolator (892) is connected to multi-core coupler (894), that is used to couple the outputs of the binary tree of optical splitters (880-1, 880-21, 880-22 . . . 880-N1 . . . 880-Nm) to one or multiple cores of multi-core coupler (894). The coupled pump and optical signals propagate into a multi-core active fiber (895) and enter multi-core coupler (896), according to the principle of operation of the optical fiber amplifier of the first type. The amplified optical signal then propagates through multi-core isolator (898) and exits into the MCF (868).

Figure 1:
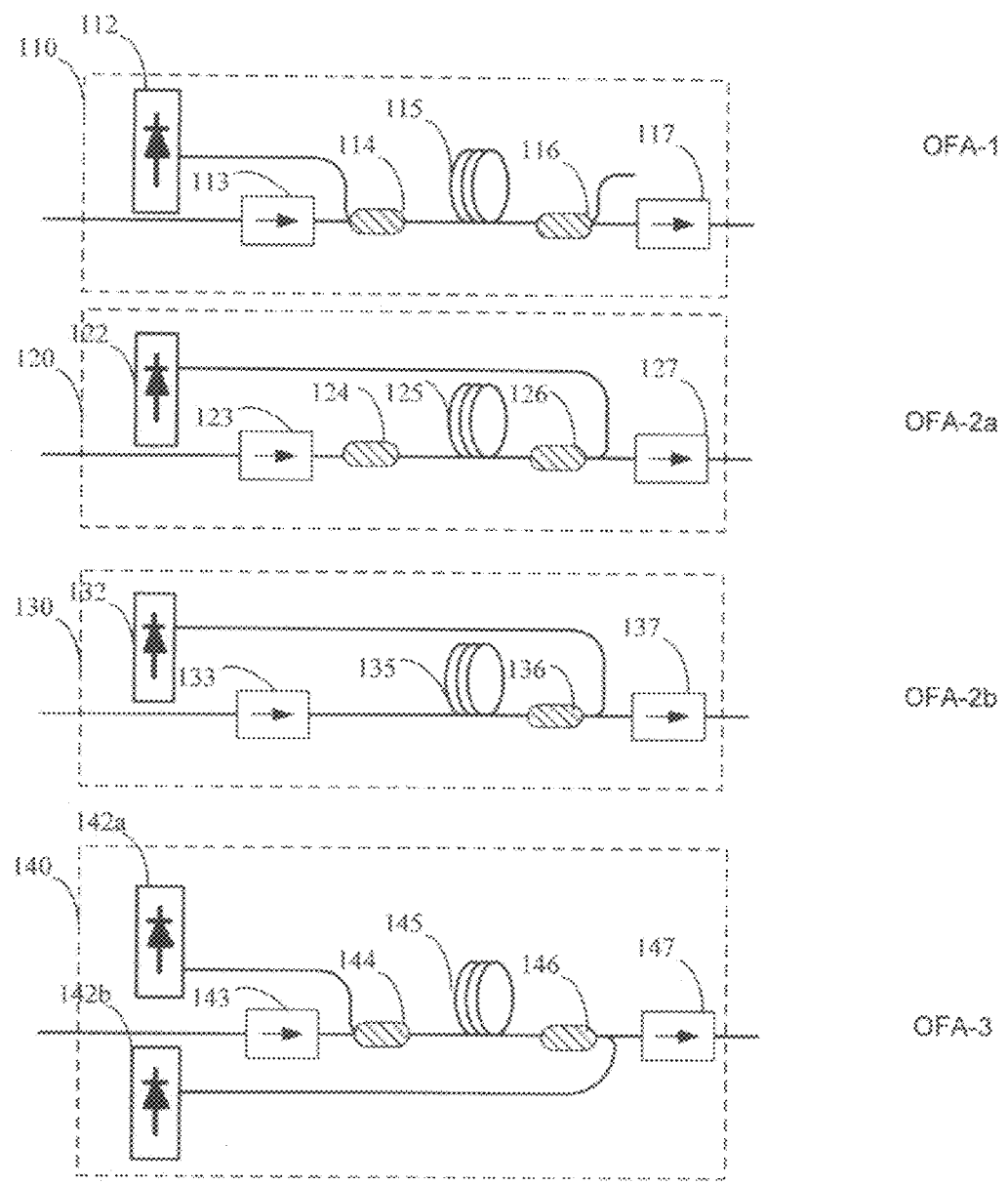
FIG. 1 shows various types of typical optical fiber amplifiers.
Figure 2:
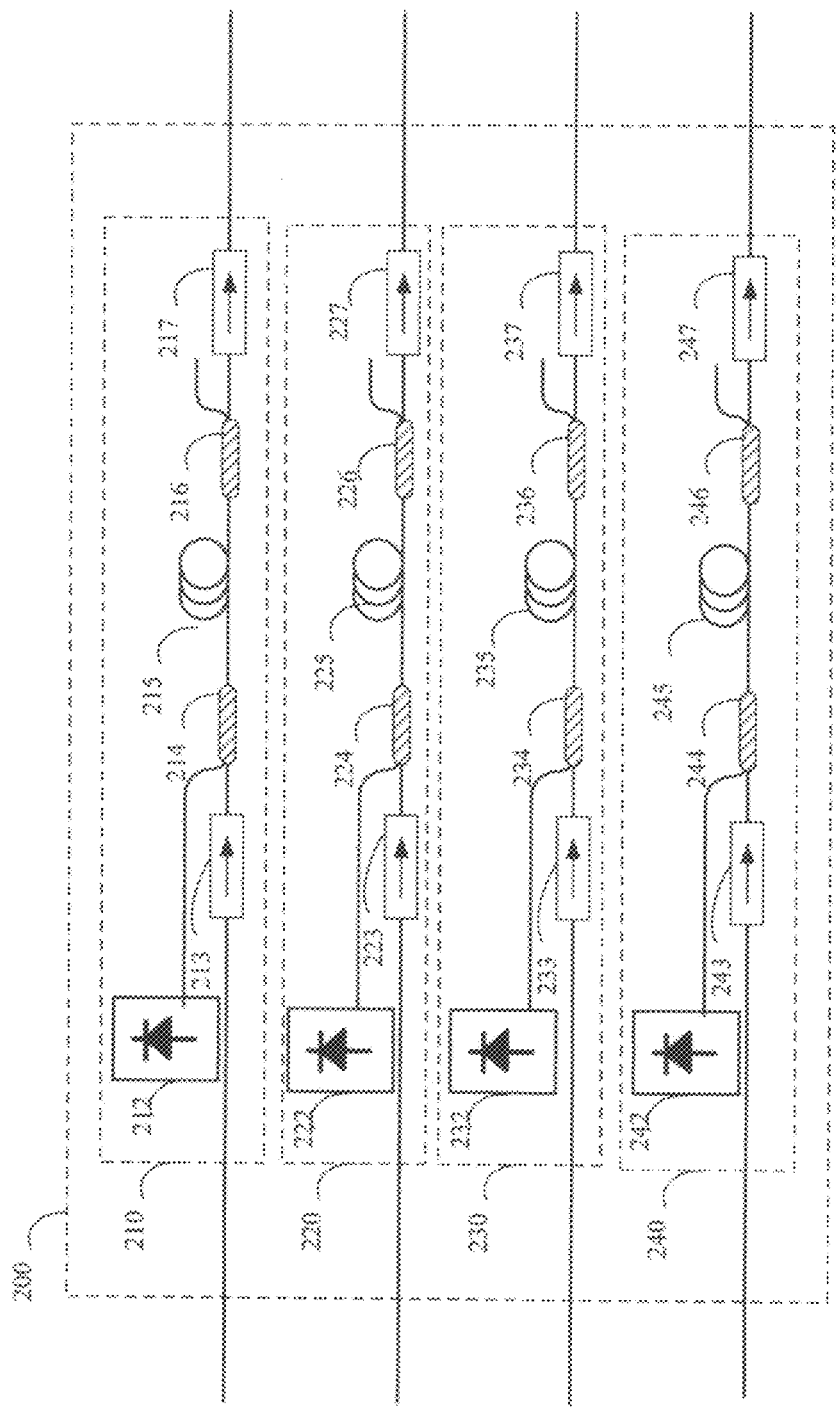
FIG. 2 shows a typical optical fiber amplifier array.

One skilled in the art will appreciate that the number of splitter ports of the binary tree may be equal to the number of cores in each MCF or maybe less than the number of the cores and the binary splitter outputs are used to simultaneously amplify a plurality of cores that are strongly coupled. Furthermore, one skilled in the art may appreciate that the output of each FOAP may be coupled to a different multi-core fiber or make use of different types of optical fiber amplifier implementation, as depicted in FIG. 1.

Figure 9A:
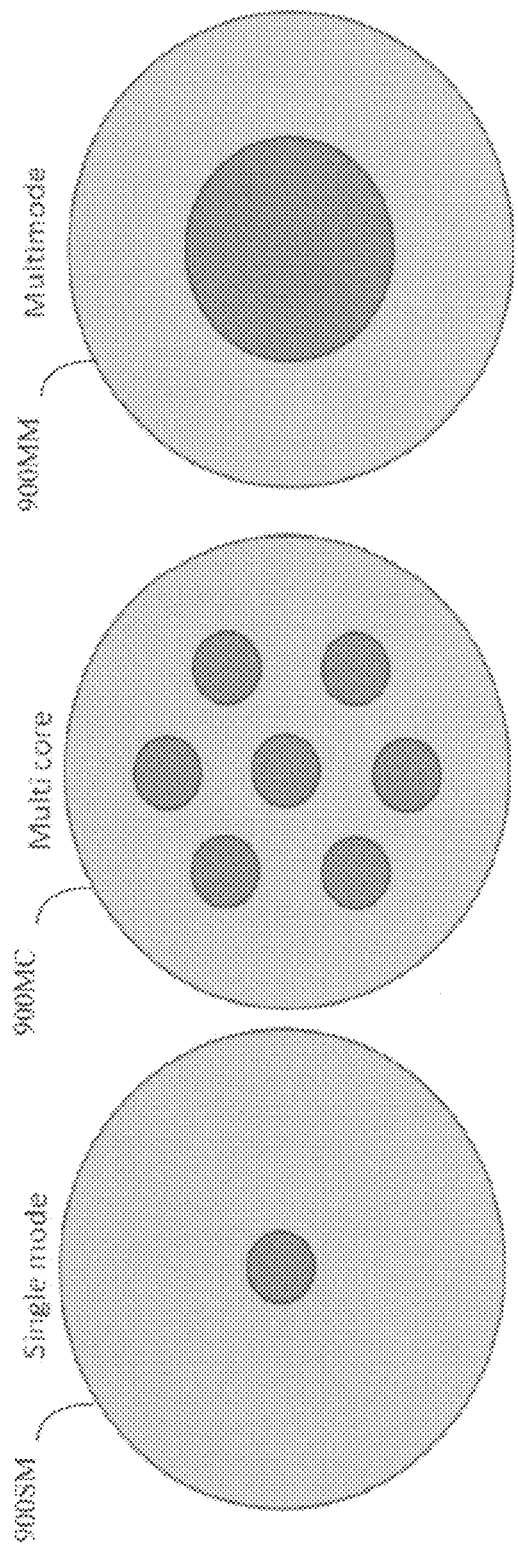
FIG. 9A shows an example of a cross-section of a single-mode fiber, of a multi-core fiber and of a multi-mode fiber.

FIG. 9A shows an example of a cross-section of a single-mode fiber (900SM), of a multi-core fiber (900MC) and of a multi-mode fiber (900MM). According to the example, a multi-mode fiber, having a core with a diameter larger than the single-core fiber is used to support different light paths within the fiber (different modes). Each optical signal is encoded into the different individual modes or groups of modes of the multi-mode fiber, hence scaling the capacity.

In a further exemplary embodiment, each FOAP in the binary tree is used to amplify each mode or group of modes, respectively. Therefore, due to the inherent advantage of being able to generate arbitrary power levels, it is perceived that "per-mode" or "per mode group" amplification can be achieved in a cost-effective way.

Figure 9B:
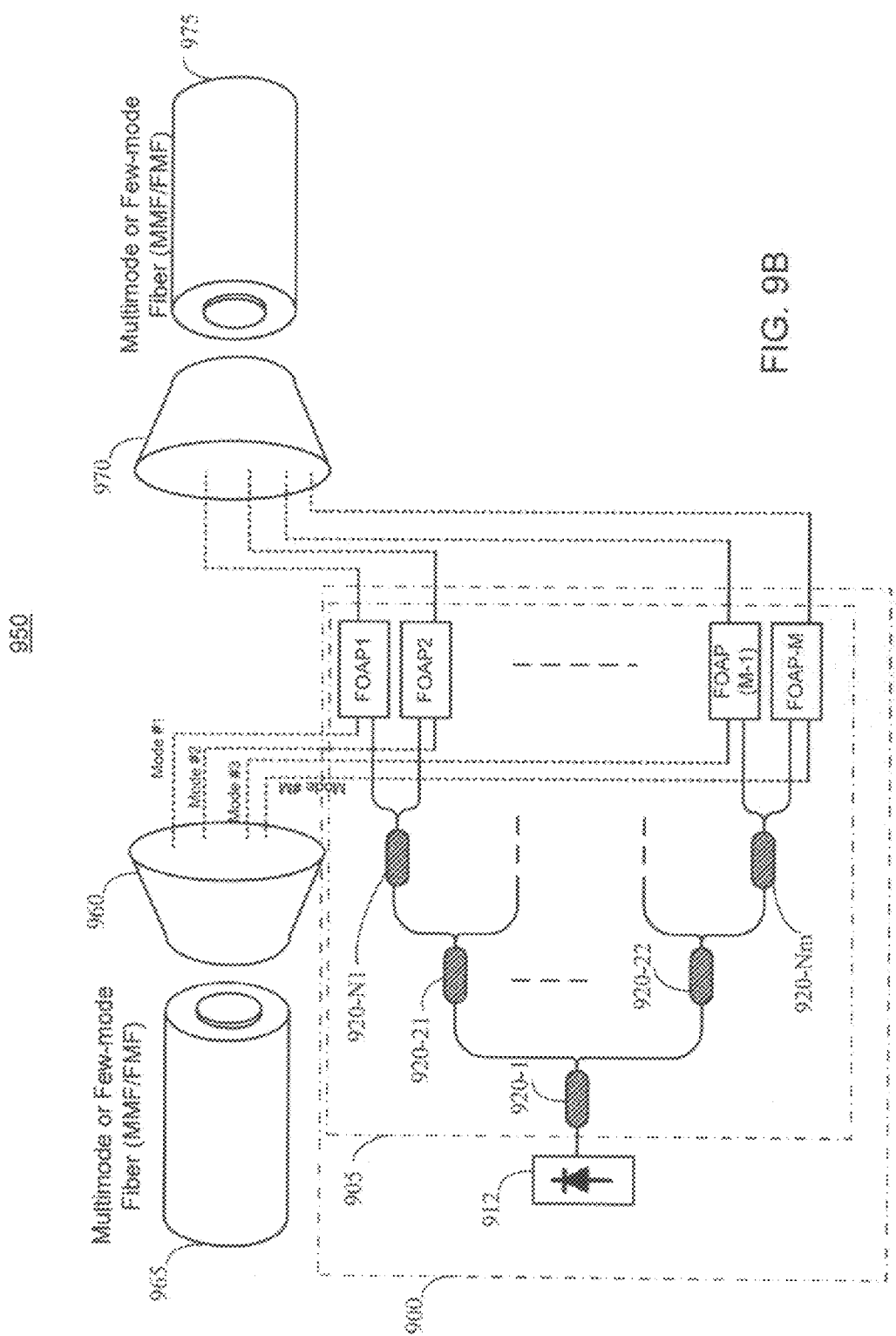
FIG. 9B is a circuit level diagram of an optical fiber amplifier array (900) employed in a Multi-Mode Fiber (MMF) network (950) according to an eighth exemplary embodiment.

FIG. 9B is a circuit level diagram of an optical fiber amplifier array (900) employed in a Multi-Mode Fiber (MMF) network (950) according to an eighth exemplary embodiment. MMF network (950) includes OAA (900), MMF Fiber (965, 975), mode de-multiplexer (960) and mode multiplexer (970). OAA (900) includes single pump laser (912) coupled to OAC (905). OAC (905) includes a set of optical splitters (920-1, 920-21, 920-22, . . . 920-N1 . . . 920-Nm), having arbitrary splitting ratios in a binary tree configuration and a set of z FOAPs (FOAP1, . . . FOAPz).

Single pump laser (912) is connected to optical splitter (920-1) at the root of the binary tree and each of the outputs of the m optical splitters at the leaves of the binary tree is connected to one of z FOAPs (FOAP1 . . . FOAPz). Single pump laser (912) provides optical splitter (920-1) with an optical beam having a power equal to the sum of powers required by the specifications of FOAPs (FOAP1 . . . FOAPz). Optical splitter (920-1) splits the optical beam into two optical beams, according to its splitting ratio. The two optical beams are provided to a pair of optical splitters (920-21, 920-22), each having its own splitting ratio, and so on, until the number of optical beams is equal to the number of FOAPs. The splitting ratios of the optical splitters are selected so that the final optical beams have the power required by the specifications of the FOAPs. Each of the final optical beams is input to one of the FOAPs. Each FOAP has two inputs. The first input is for the optical signal to be amplified and the second input is for each of the final optical beams.

In the exemplary embodiment of FIG. 9B, each first input is coupled to each mode output of mode de-multiplexer (960). Mode de-multiplexer (960) is coupled to a multi-mode or few-mode fiber. Likewise, each output of each FOAP is coupled to each input of mode multiplexer (970). Mode multiplexer (970) is coupled, at the other end, to a multi-mode or few-mode fiber. One skilled in the art may appreciate that the number of FOAPs is equal to the number of modes in each MMF/FMF. Furthermore, one skilled in the art may appreciate that the output of each FOAP may be coupled to a different single-core fiber.

In a further exemplary embodiment, the optical splitters may be variable optical splitters. That means that their splitting ratio is not predefined, but is adjusted dynamically in response to a control signal from a controller. Thus, the amplification level of each FOAP in the OAA is dynamically controlled. This would allow for: (i) optimization of power delivery in different amplifiers according to real-time traffic loads, (ii) expansion and/or changes in the network links due to increase/decrease of end-users at different locations of the network such as in for Fiber-to-the-Home applications, and (iii) dynamic equalization of modes in future multi-mode optical networks.

Figure 10:
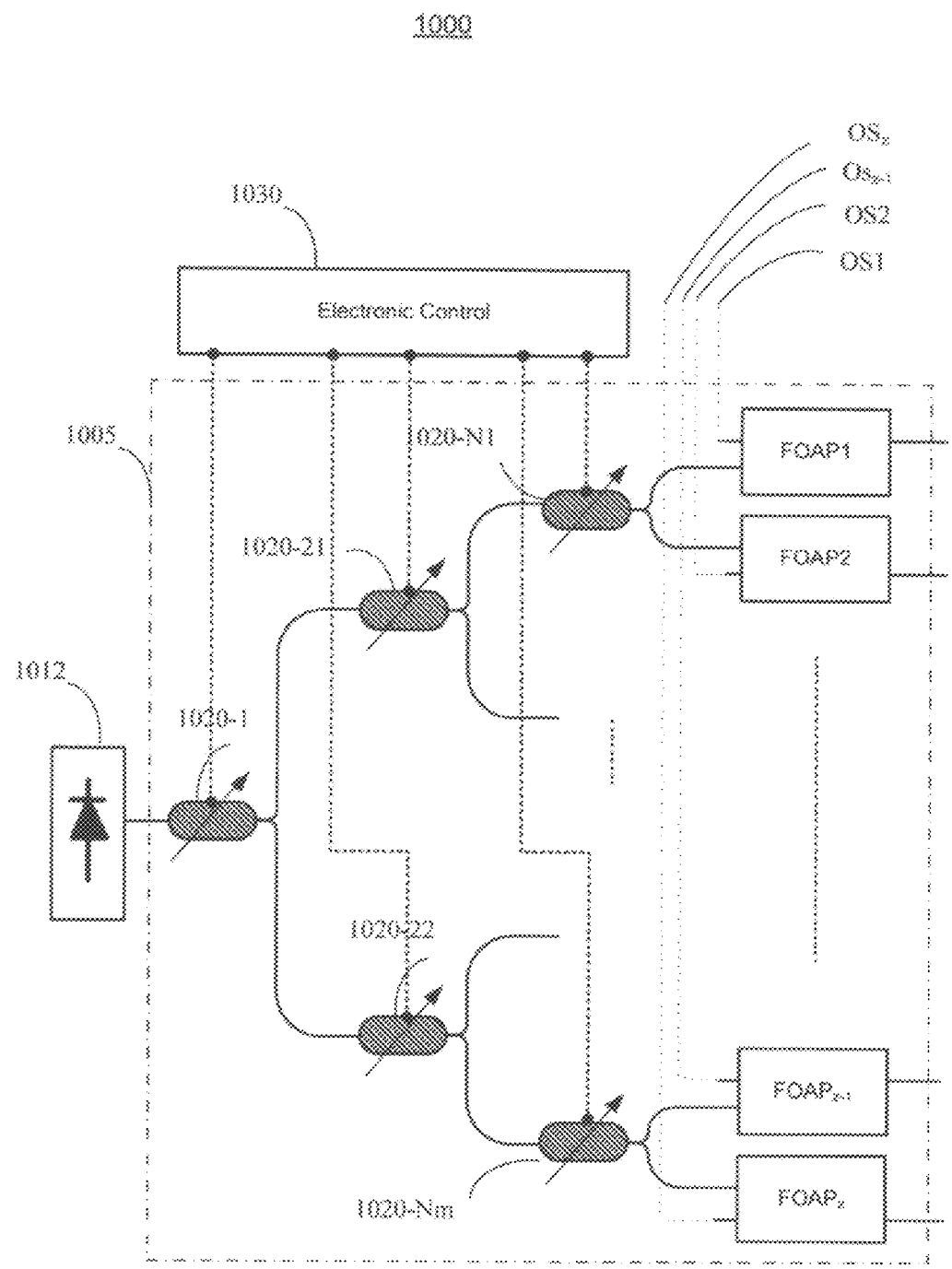
FIG. 10 is a block-level diagram of a dynamically controlled optical fiber amplifier array (1000) according to a tenth exemplary embodiment.

FIG. 10 is a block-level diagram of a dynamically controlled optical fiber amplifier array (1000) according to a ninth exemplary embodiment. OAA (1000) includes single pump laser (1012), OAC (1005) and controller (1030). OAC (1005) includes a set of optical splitters (1020-1, 1020-21, 1020-22, . . . , 1020-N1 . . . 1020Nm), having variable splitting ratios in a binary tree configuration and a set of z FOAPs (FOAP1, . . . FOAPz).

Single pump laser (1012) is connected with optical splitter (1020-1) at the root of the binary tree and each of the outputs of the m optical splitters at the leaves of the binary tree is connected to one of FOAPs (FOAP1 . . . FOAPz). Single pump laser (1012) provides optical splitter (1020-1) with an optical beam having a power equal to the sum of powers required by the specifications of FOAPs (FOAP1 . . . FOAPz). Optical splitter (1020-1) splits the optical beam into two optical beams, according to its splitting ratio. The two optical beams are provided to a pair of optical splitters (1020-21, 1020-22), each having its own splitting ratio, and so on, until the number of optical beams is equal to the number of FOAPs.

The splitting ratios of the optical splitters are controlled by Electronic Control 1030 so that the final optical beams have the power required by the specifications of the FOAPs. Each of the final optical beams is input to one of the FOAPs. Each FOAP has two inputs. The first input is for the optical signal to be amplified and the second input is for each of the final optical beams.

The advantage of the exemplary embodiment of FIG. 10 is that, should the operational characteristics of one of the FOAPs, such as output power, gain or wavelength-dependent gain profile need to change, then the Electronic Control reprograms the variable optical splitters to dynamically generate a new binary tree with new splitting ratios according to the new requirements of the set of FOAPs. One skilled in the art may appreciate that Electronic Control may be part of OAC 1005, part of OAA 1000 or remotely connected to either OAA (1005) or OAA (1000).

Figure 11:
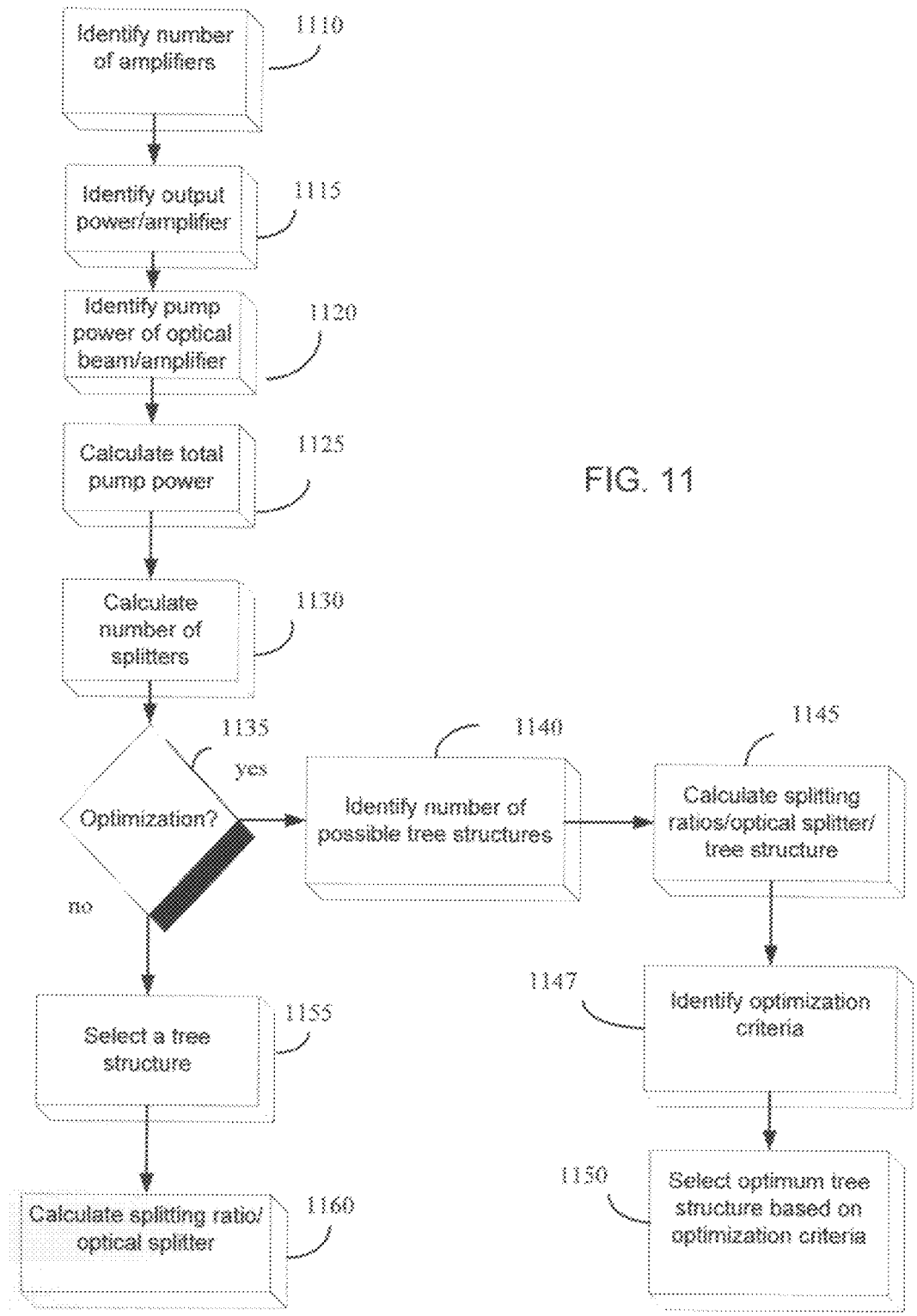
FIG. 11 is an operational flow diagram of selecting a binary tree configuration for the embodiments of FIGS. 3-10.

FIG. 11 is an operational flow diagram for selecting a binary tree configuration for the embodiments of FIGS.—FIG. 10. In first step (1110), the number of amplifiers or FOAPs is identified. In step (1115) the output power per amplifier (or FOAP) is identified. In step (1120) the required pump power of the optical beam per amplifier (or FOAP) is identified.

In step (1125), the total pump power is calculated. In step (1130), the total number of optical splitters is calculated. In a further step (1135), a decision is made whether an optimization of binary tree configuration of optical splitters is required based on predefined criteria.

If an optimization is required, then in step (1140), all the possible binary tree configurations are identified. Then, in step (1145), all the splitting ratios of each optical splitter for each binary tree configuration are calculated. Then, in step (1147), the optimization criteria are identified.

Finally, in step 1150, the optimum binary tree configuration, based on optimization criteria, is selected. Optimization criteria may include minimizing total number of unique optical splitter types, minimizing cost, optimizing inventory or any other selection criteria. In case no optimization is necessary then, in step 1155, a binary tree configuration is arbitrarily selected. Finally, in step 1160, the splitting ratios of the optical splitters of the selected binary tree configuration are calculated.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for amplifying a plurality of optical signals comprising:
   a set of optical splitters arranged in a binary tree configuration including a root and leaves for receiving an initial optical beam from a pump laser coupled at the root of the binary tree configuration, where the leaves of the binary tree configuration provides a plurality of optical beams; and
   a multi-core fiber providing the plurality of optical signals;
   a plurality of fiber optical amplifying path (FOAP) circuits each configured to receive and amplify one of the plurality of optical signals,
   where each of the optical splitters at the leaves of the binary tree provides, to one of the plurality of FOAP circuits, one of the plurality of optical beams having a power required to amplify one of the plurality of optical signals;
   where each optical splitter in the binary tree configuration is selected based on its splitting ratio so that the optical splitters at leaves of the binary tree configuration provide the plurality of FOAPs with the plurality of optical beams each having the power required to amplify respective ones of the plurality of optical signals.

2. The device of claim 1, where at least one FOAP circuit is pumped in at least one of co-propagating mode and counter-propagating mode.

3. The device of claim 1, where the binary tree configuration is asymmetric.

4. The device of claim 1, further comprising a multi-mode fiber, wherein the multi-mode fiber carries multiple and further comprising a mode de-multiplexer coupled to the output of the multi-mode fiber for de-multiplexing the multiple modes to generate the plurality of optical signals amplified within the plurality of FOAPs.

5. The device of claim 1, where each optical splitter is a variable optical splitter.

6. The device of claim 5, further comprising a controller for setting the splitting ratio of each variable optical splitter.

7. The device of claim 1, where at least a portion of the binary tree configuration or of each FOAP circuit is implemented using at least one of active, passive waveguides and micro-optic components and active, passive waveguides and micro-optic sub-assemblies on a substrate.

8. The device of claim 1, where at least a portion of the binary tree configuration or of each FOAP circuit is implemented using passive waveguides.

9. A system having a device for amplifying a plurality of optical signals comprising:
   a set of optical splitters arranged in a binary tree configuration including a root and leaves for receiving an initial optical beam from a pump laser at the root, where the leaves provide a plurality of optical beams;
   a multi-core fiber which provides the plurality of optical signals; and
   a plurality of fiber optical amplifying path (FOAP) circuits each configured to receive and amplify one of the plurality of optical signals,
   where each of the optical splitters at the leaves of the binary tree is coupled to one of the plurality of FOAP circuits to provide one of the plurality of optical beams having a power required to amplify respective ones of the plurality of optical signals.

10. The system of claim 9, further comprising a second multi-core fiber, where each core of the second multi-core fiber receives each of the plurality of amplified optical signals, respectively.

11. A system having a device for amplifying a plurality of optical signals comprising:
   a set of optical splitters arranged in a binary tree configuration for receiving an initial optical beam and providing a plurality of optical beams; and
   a fiber optical amplifying path circuit having a set of multi-core components (MC-FOAP) configured to amplify the plurality of optical signals,
   where each of the optical splitters at the leaves of the binary tree is coupled to one of the cores of the MC-FOAP circuit to provide one of the plurality of optical beams having a power required to amplify the optical signal.

12. The system of claim 11, where the MC-FOAP includes a multi-core doped fiber for amplifying each of the plurality of optical signals within each core of the multi-core doped fiber.

13. The system of claim 12, where the MC-FOAP amplifies more than one optical signals simultaneously when the network includes multi-core fibers with strongly coupled optical signals.

14. The system of claim 11, further comprising: a first multi-mode fiber carrying a plurality of modes; and a mode de-multiplexer for de-multiplexing the plurality of modes to generate the plurality of optical signals to be amplified within the FOAPs.

15. The system of claim 14, further comprising: a mode multiplexer for multiplexing the plurality of amplified optical signals to generate a multiplexed multi-mode signal; and a second multi-mode fiber for carrying the multiplexed multi-mode signal.

* * * * *